Aug. 30, 1960     H. W. MOSER ET AL     2,950,658
CONTINUOUS RUNNING MACHINES FOR PRODUCING BOX BLANKS
Filed May 21, 1958     3 Sheets-Sheet 1
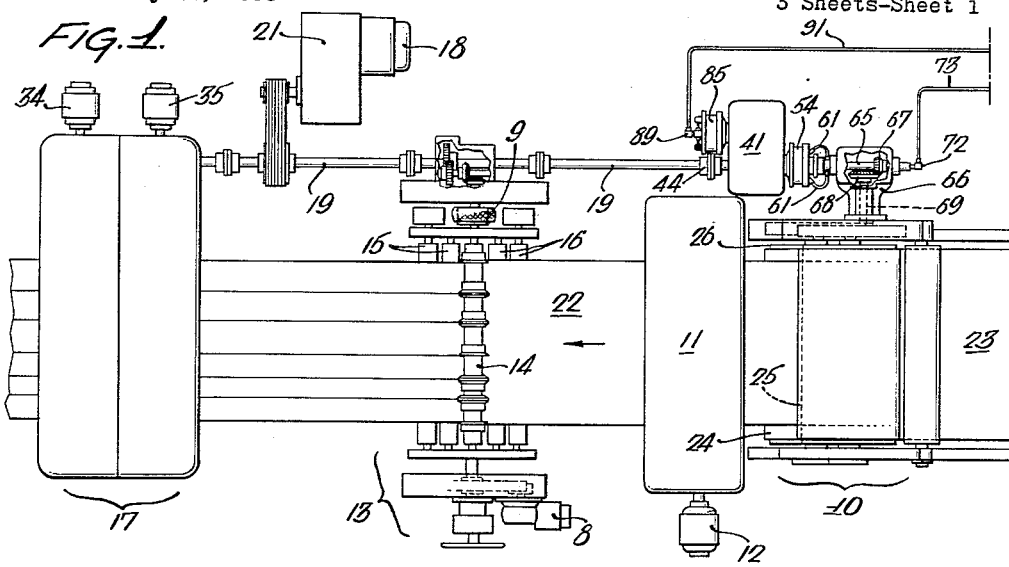
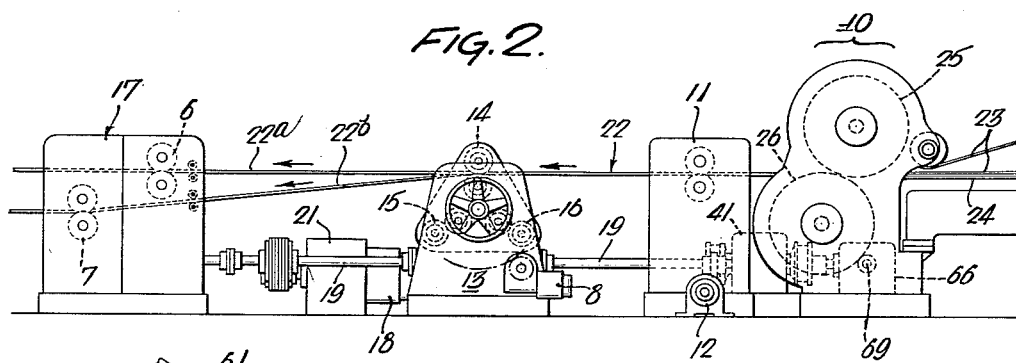
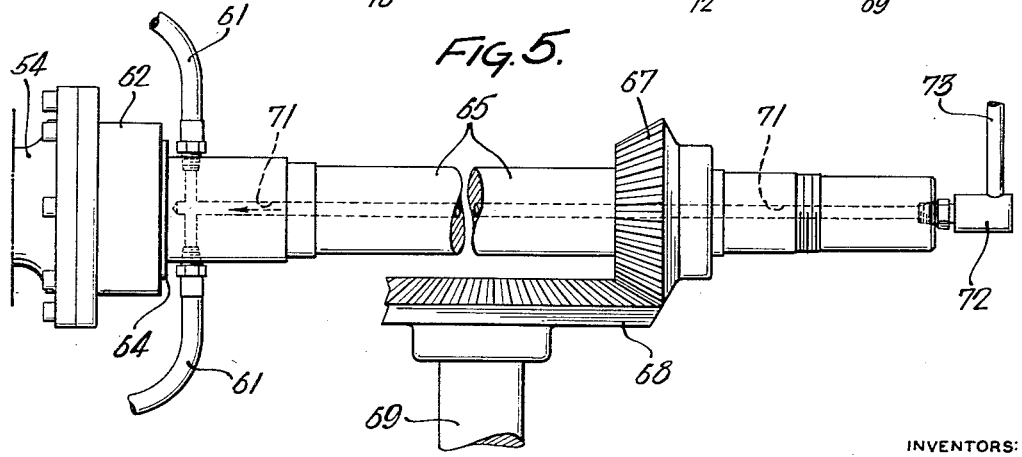
INVENTORS:
HENRY W. MOSER
GEORGE W. McGIRR
BY Howson & Howson
ATTYS.

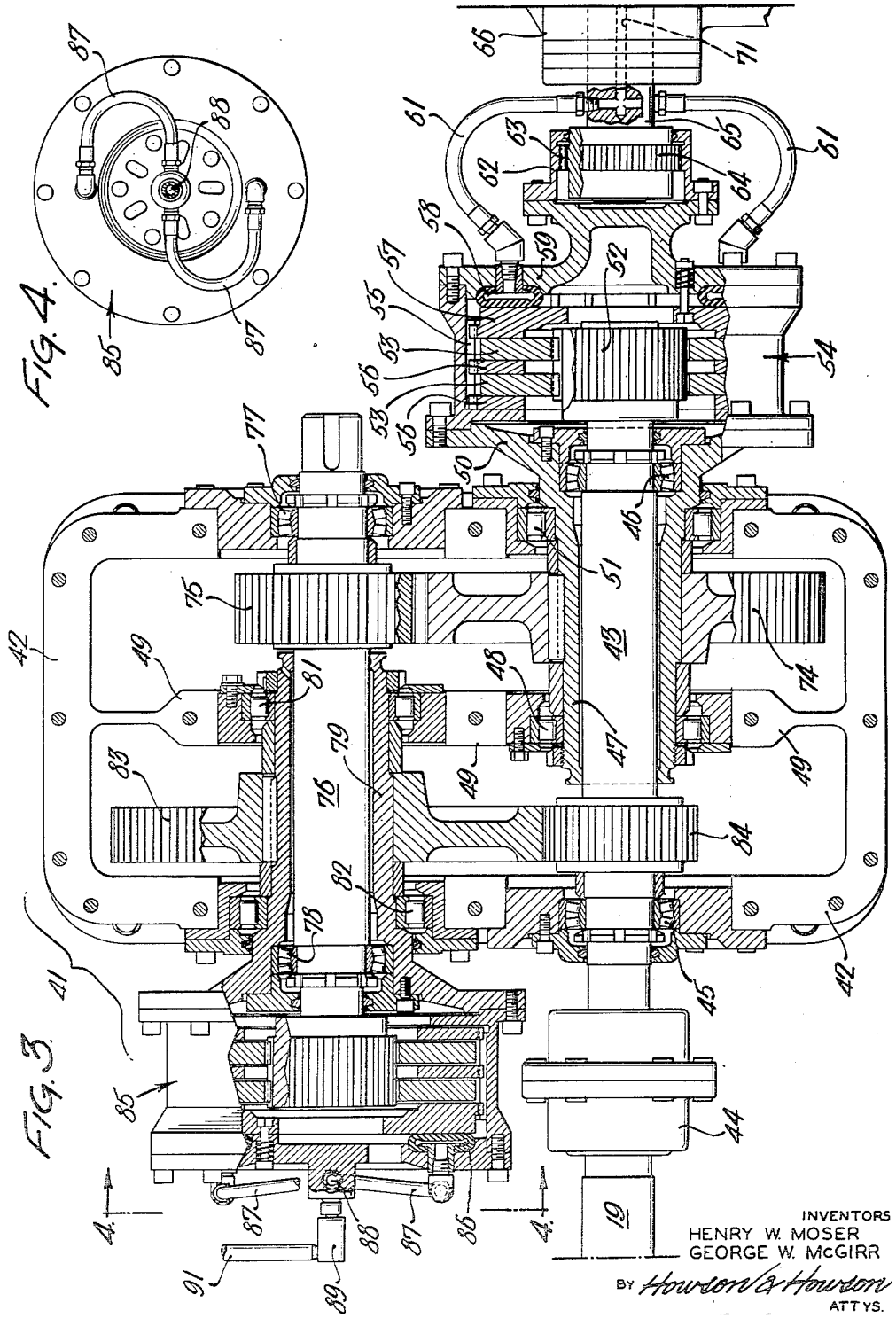

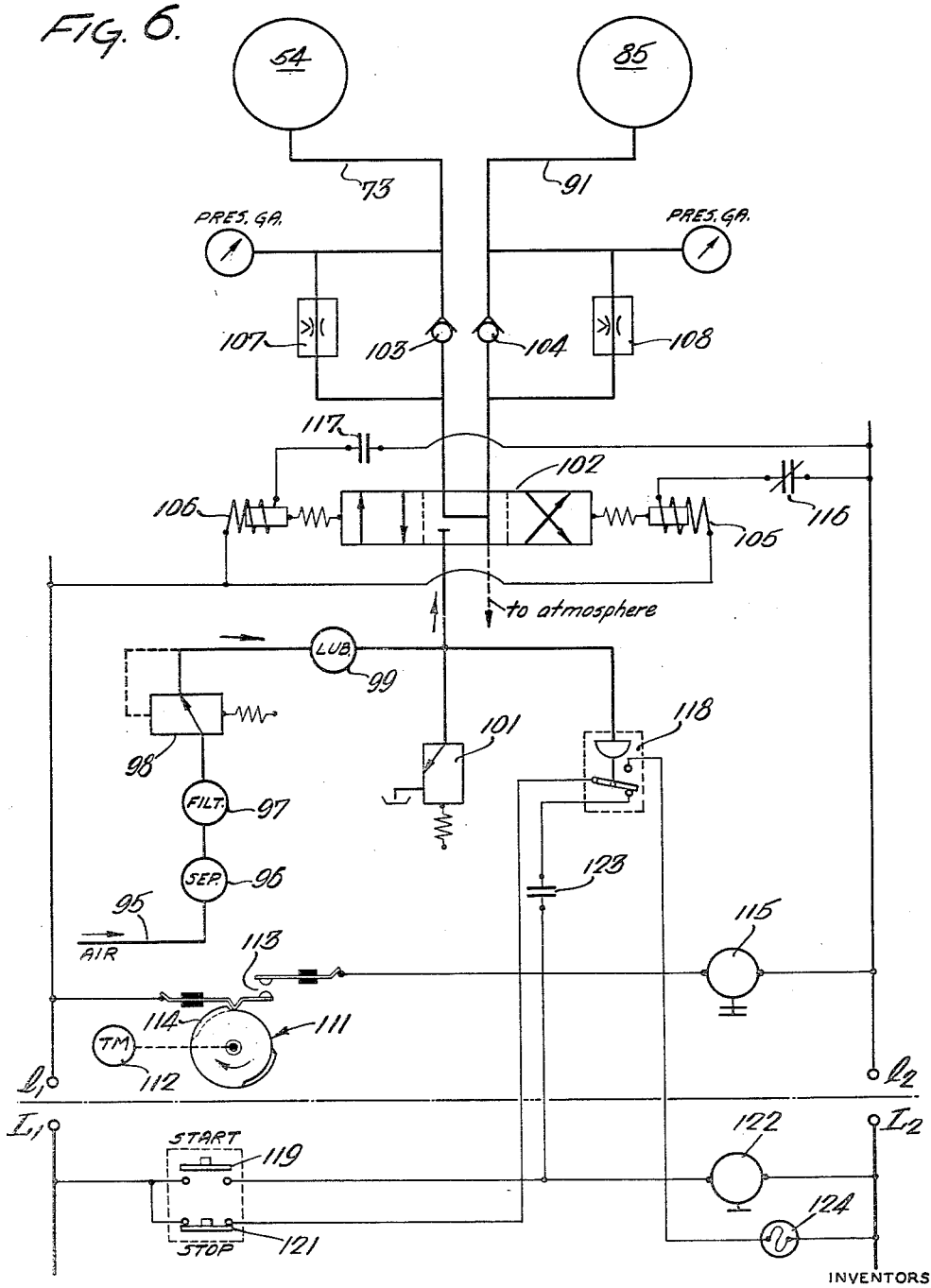

United States Patent Office 2,950,658
Patented Aug. 30, 1960

2,950,658

CONTINUOUS RUNNING MACHINES FOR PRODUCING BOX BLANKS

Henry William Moser, Haddonfield, and George W. McGirr, Riverside, N.J., assignors to Samuel M. Langston Company, Camden, N.J., a corporation of New Jersey Filed May 21, 1958, Ser. No. 736,892

8 Claims. (Cl. 93—58)

This invention relates to improvements in machines of the type disclosed in United States Patents 2,309,728 and 2,764,217. These machines are designs to produce and continuously advance webs of stiff sheet material, such as double faced corrugated board, to then operate on said board through mechanisms arranged in its path of travel to produce box or other blanks of desired size and form. In the present instance the machine is illustrated as comprising a double facer machine, generally of conventional form in which a single faced corrugated web receives a second facing adhesively secured to form a double faced web, a shear which immediately adjoins the output end of the double facer, a multiple slitting and scoring machine which operates on the composite web after leaving the double facer and which may be manipulated to present to the web selectively any one of a plurality of different slitting and scoring heads preset to work the web as desired, and a rotary cut off which cuts the slit and scored web into sections of required length to form the individual blanks. Power to drive the double facer, the slitter-scorer, and the cut off is derived from a common motor connected to a common line shaft.

In the machines of the prior patents referred to above, means is provided for maintaining the several parts of the machine, including the double facer, in continuous operation during adjustments of the slitter-scorer and cut off required for change over from one form or size of blank to another. In accomplishing this result, the composite web is severed as it leaves the double facer by a one revolution shear located in proximity to the delivery end of the double facer and the speed of the double facer is then immediately reduced relative to the speed of the other parts of the machine so as to afford an increasing gap between the severed ends of the web within which the desired adjustments of the slitter scorer and rotary cut off may be made. The speed of the double facer is then restored to the speed of the slitter-scorer and cut off so that the forward end of the severed web passing from the double facer may be received by the slitter-scorer and cut off at a speed at least approximately the speed of operation of those mechanisms. Thereafter the speed of the machine as a whole may be adjusted as required.

The mechanisms of the prior patents for slowing down the double facer as described above were subject to certain inherent faults. Thus, the differential type transmission disclosed in the aforesaid U.S. Patent 2,764,217, while providing for reduction in the speed of operation of the double facer, does not establish a relatively fixed ratio between the speed of the line shaft and that of the double facer at the low speed. The line shaft speed is subject to considerable variation due to fluctuations in the load on a voltage to the line shaft drive motor, and since the differential which is relied upon to give the desired double facer speed reduction is driven by a separate motor at a constant speed, the aforesaid ratio will vary materially with each such variation in line shaft speed. In extreme cases, this variation is sufficient to reverse the direction of travel of the double faced web in the double facer, and in other cases the low speed of the double facer is relatively so high that the forward end of the severed web coming from the double facer will arrive at the slitter-scorer before the latter mechanism has indexed to the new position.

A principal object of the present invention is to provide in a machine of the stated type an improved variable speed transmission affording the desired reduction in the speed of the double facer unit that will preclude the aforesaid undersirable results.

To this general end the invention contemplates an improved transmission means that, regardless of fluctuation in line shaft speed, will afford a fixed ratio between the line shaft speed and the low speed of the double facer.

The mechanism of the prior patents were also mechanically relatively complicated, and the component parts were costly to assemble and required considerable maintenance, the high cost of the components and the high cost of disassembly and assembly making the maintenance cost excessive.

Another object is to provide a transmission means as described affording precise control of the rate at which the changes in the speed of the double facer are effected.

More specifically the invention contemplates an improved two speed transmission connecting the double facer to the line shaft as described which permits driving the double facer machine through the transmission either at line shaft speed or at a built-in, precise pre-selected speed lower than that of the line shaft.

A further object is to provide a two speed transmission of the stated character comprising fluid actuated clutch means affording precise control of the rates at which the said changes in the speed of the double facer may be effected.

A still further object is to provide in conjunction with said clutches a fluid pressure system comprising controls affording engagement and disengagement of the clutches at desired rates.

Another important object is to provide a transmission and control system which, because it is designed around conventional and commercially available component parts, is relatively inexpensive as to initial assembly as well as to disassembly and reassembly for maintenance purposes.

The invention contemplates also a two speed transmission unit of the stated character which is of strong, rugged and durable construction and which thereby requires little maintenance.

The invention will be more readily understood by reference to the attached drawings wherein;

Fig. 1 is a diagrammatic plan view of a blank forming machine including a double facer and associated blank forming mechanism;

Fig. 2 is a side elevational view of the machine illustrated in Fig. 1;

Fig. 3 is a horizontal sectional view on an enlarged scale through the two-speed transmission unit which constitutes a primary novel feature of the invention;

Fig. 4 is a sectional view on the line 4—4, Fig. 3;

Fig. 5 is an enlarged fragmentary view showing the manner in which the transmission unit of Fig. 3 is connected to the double facer;

Fig. 6 is a diagrammatic view showing the fluid pressure system for actuation of the clutch elements of the transmission unit, together with the immediately related portions of the electric control system for the machine.

With reference to Figs. 1 and 2 of the drawings the output end of the double facer machine is indicated by the reference numeral 10. Immediately adjoining this end of the double facer is a one revolution web shear device indicated generally by the reference numeral 11 and operated through the medium of an independent motor 12. The slitter-scorer unit is shown at 13, this unit being of triplex type comprising three separate slitter-scorer heads designated by the reference numerals 14, 15 and 16 mounted on a common rotary carriage which may be indexed in either direction to bring the said heads selectively into operative position with respect to the work web as hereinafter more particularly described. This slitter-scorer may suitably be of the type disclosed in my co-pending United States patent application Serial Number 639,922, now Patent 2,865,264, wherein the individual heads 14, 15 and 16 are driven frictionally from a common driver wheel 9 with which the head is automatically engaged when the head is indexed to the aforesaid working position. When one of the heads is thus engaged with the driver, the others are idle and their slitting and scoring elements may be adjusted as required to produce blanks of desired character. Rotation of the carrier to index the heads is by means of a motor 8. The rotary cut off which cuts the work web into sections of desired length is shown at 17, this cut off being of the duplex form disclosed in United States Patent 2,309,728 and including means (not shown) for preselectivity setting the two sets of shear blades 6 and 7 to desired blank lengths. The double facer, the slitter-scorer, and the cut off 17 are driven from a common power source, consisting in the present instance of a main drive motor 18, through a line shaft 19, the motor being connected to the shaft 19 through the medium of a Reeves or other suitable variable speed drive 21.

The double facer 10 may be of a character shown in the aforesaid United States Patent 2,309,728. From the double facer, the double faced web, indicated by the reference numeral 22, is advanced by upper and lower traction belts 23 and 24, these belts passing respectively around rolls 25 and 26 driven from the line shaft 19 as hereinafter described. From the double facer the web 22 passes through the normally inoperative one revolution shear 11 and then to and through the slitter-scorer 13, wherein in the present instance the web is divided longitudinally into two parts 22a and 22b which pass respectively to the cut off units 6 and 7 of the rotary cut off 17 for division into sections of required length.

In accordance with the present invention the line shaft 19 is connected to the double facer by way of a two-speed transmission unit indicated generally in the drawings by the reference numeral 41. This transmission unit is shown in detail in Fig. 3 of the drawings. It comprises a relatively fixed housing 42 in which is journaled a main drive shaft 43 one extended end of which is connected to the line shaft 19 through the medium in the present instance of a coupling 44. The one end of this shaft is journaled in bearings 45 directly in the housing 42, while the other end is journaled in bearings 46 in the interior of a hollow shaft section 47, this latter section being journaled in bearings 48 in the partition 49 of the housing 42 and in a bearing 51 in the wall of the housing proper. The shaft 43 has on the outer end thereof a pinion 52 to which are splined two radially extended disc elements 53, 53. The outer end of the shaft section 47 carries a cylindrical housing 50 having splines 55 projecting inwardly from the cylindrical wall thereof which mesh with complementary teeth at the outer peripheries of a plurality of discs 56, 56, and 57 which intersperse with the discs 53, 53 and which with the latter form elements of a friction clutch 54 by means of which the shaft 43 may be coupled to the shaft section 47. The elements 53, 56 and 57 may be pressed together to engage the clutch by means of fluid pressure applied to an annular resilient tube 58 which is confined between the outer faces of the discs 57 and the adjoining wall 59 of the housing 50 and which is connected through tubes 61, 61 to a suitable source of pressure fluid, preferably air, as hereinafter described.

The outer end of the housing 50 has a hollow fitting 62 containing an internal gear 63 and this gear meshes with a gear 64 carried on the end of a shaft 65. This shaft is journaled in a gear case 66, see Fig. 1, on the end of the double facer and carries a pinion 67 which meshes with a gear 68 on shaft 69 which constitutes the driving shaft for the double facer, being operatively connected with the rolls 25 and 26 in manner well known in the art. The tubes 61 are connected to a passage 71 which extends longitudinally through the shaft 65 to the outer end of the latter, and which is connected through a fitting 72 and tube 73 to a suitable source of pressure fluid.

When the annular tube 58 is deflated the discs 56, 53, 57 are disengaged so that there is no driving connection through this clutch between the shaft 43 and the shaft 65. When the tube 58 is inflated by air or other pressure fluid from the source, the clutch 54 will be engaged in obvious manner thereby establishing an operative connection between the shaft 43 and the housing 50 and through the housing and the gears 63 and 64 with the shaft 65.

The hollow shaft section 47 has keyed thereto a gear 74 and this gear meshes with a gear 75 on a jack shaft 76 journaled in the housing 42. One end of the shaft 76 is journaled in a bearing 77 in the housing, while the other end is journaled in a bearing 78 in a hollow shaft section 79. This latter shaft section in turn is journaled in bearings 81 in the aforesaid partition 49 of the housing and in a bearing 82 in the housing well. Keyed to the shaft section 79 is a gear 83 which meshes with a gear element 84 on the shaft 43. At the outer end of the hollow shaft section 79 is a clutch unit 85 which corresponds in form, structure and mode of operation with the clutch associated with the shaft section 47 and described above. The clutch 85 when engaged establishes a coupled relation between the shafts 76 and 79, and when disengaged permits rotation of the shaft 76 independently of the shaft 79.

The clutch 85 comprises a resilient inflatable tube 86 through the medium of which the clutch is engaged and disengaged as described above, and in the present instance this tube is connected through ducts 87, 87 with a passage 88 in the outer wall of the clutch housing coaxial with the shaft 76. This passage 88 in turn is connected through a rotary coupling 89 and through a tube 91 with the source of fluid pressure.

It is apparent that when the clutch 54 is engaged and the clutch 85 is disengaged there will be a direct driving connection through the former clutch between the line shaft 19 and the drive shaft 69 of the double facer. When the clutch 54 is disengaged and the clutch 85 is engaged the driving connection between the line shaft 19 and the double facer drive shaft 69 will be through the gears 84 and 83 to the shaft 79, thence through clutch 85 to shaft 76, through gears 75 and 74 to the hollow shaft 47 and through the housing of the clutch 54 to the shaft 65, and to double facer drive shaft 69. The double facer will then be driven at a reduced speed relative to the speed of the line shaft 19. Clutches of this character are well adapted for the purposes of the present invention.

The present machine is adapted for automatic change over from production of one form and size of blank to another without interrupting the operation of the double facer. Control systems for accomplishing this result are disclosed in the aforesaid Patents 2,309,728 and 2,764,217. Prior to and in preparation for the change over operation, one of the idle heads of the slitter-scorer 13, either 15 or 16 as shown in Fig. 2, is set up in accordance with the requirements of the new blank or blanks and the preselector means in the electrical control circuit is set to bring the newly adjusted head into the working position at the top of the slitter-scorer after the change over cycle has been initiated, as fully described in the aforesaid patents. The rotary cut off 17 is also preselectively set so that at the proper time in the change over cycle one or both of the component cut off units 6 and 7 will be adjusted by motors 34 and 35 to afford the desired blank length if change in length is required, all as fully set forth in the said patents. The machine is now ready for initiation of the change over cycle.

The sequence of operations in the change over cycle is as follows:

First, whether the machine as a whole has been running fast or slow, it will automatically be brought to a preselected speed, say for example 185 feet per minute. The rotary shear 11 will then operate through one revolution to sever the web 22. Simultaneously, the transmission 41 will operate, as hereinafter more fully described, to slow down the double facer 10 from the preselected 185 linear feet per minute to a predetermined reduced speed of, for example, 40 linear feet per minute. While the double facer is operating at this reduced speed the leading portion of the severed web continues to travel through the slitter-scorer 13 and the cut off 17 at 185 linear feet per minute. When the sheet clears the slitter-scorer the latter will index 120° in the predetermined direction to bring the newly set head to the working position. At the same time the rotary cut off elements 6 and 7 of the duplex cut off 17 adjust to the new blank length. The variable transmission 41 will now act to restore the double facer to the preselected speed of 185 linear feet per minute which completes the cycle. The machine speed may now be adjusted as desired through Reeves drive 21.

With further reference to the transmission unit 41 and its mode of operation, when the machine is in normal operation the clutch unit 54 will be engaged to establish a direct connection through the shaft 43 of the unit between the line shaft 19 and the double facer, the latter then being operated at normal speed synchronized with the slitter-scorer and duplex cut off units also operatively connected with the line shaft. When, in the early part of the aforedescribed change over cycle, the double facer is slowed down, this slow down is effected by disengagement of the clutch unit 54 and simultaneous engagement of clutch unit 85. The drive from the line shaft to the double facer is then by way of jack shaft 76 of the transmission 41, as previously described, with resulting reduction of double facer operating speed relative to the speed of the line shaft 19.

Actuation of the clutches 54 and 85 as described above is effected through the fluid pressure system illustrated in Fig. 6. Fluid pressure is drawn from a pressure air line 95. This line contains a separator 96, filter 97, adjustable pressure regulator valve 98, and lubricator 99. Also connected to the line is a pressure relief valve 101. Flow of the regulated pressure air to the clutches 54 and 85, and also release of the air from the clutches, is controlled by a solenoid actuated valve 102. In its neutral or intermediate position as shown, this valve acts to connect the pressure tubes 58 and 86 of the respective clutches to atmosphere, through lines 73 and 91 and associated check valves 103, 104. When the valve is adjusted to the right, as viewed in the drawing, by solenoid 105, the pressure line 95 will be connected through line 71 to clutch 54, while the clutch 85 will be connected to atmosphere. The double facer 10 will then operate at line shaft speed in synchronism with slitter-scorer 14 and cut off 17. This is the normal operating position. When the valve 102 is adjusted to the left beyond neutral position by solenoid 106, line 91 leading to clutch 85 will be connected to pressure line 95; and pressure in clutch 54 will be released to atmosphere. The double facer 10 will then operate at reduced speed while the slitter-scorer and cut off continue at the line shaft speed.

It will be noted that by reason of the check valves 103 and 104, pressure fluid passing to the clutches must pass through adjustable flow control valves 107 and 108 which regulate the rate of flow of the fluid to the clutches and thereby the rate at which the clutches are engaged. Thus the clutches and associated transmission elements not only afford a positive control of the low speed of the double facer, but also accurate control of the rate at which the changes from one speed to another are made. In effect the preselected low speed is a built-in functional part of the transmission. In another functional aspect of the device, it will be noted that in changing from the high to low speed double facer operation, the immediate release of pressure from the high speed clutch 54 and the controlled application of fluid pressure to low speed clutch 85 causes the latter to act as a braking means for the double facer, the braking action being smooth and gradual over the period of engagement as predetermined by adjustment of the flow control 108. Similarly, in reverse, the controlled application of pressure fluid to the high speed clutch insures an accurately timed and gradual building up of the speed of operation of the double facer to line shaft speed.

As previously described and as set forth in the aforesaid patents, the cycle of operations which includes the cutting of the web at the delivery end of the double facer, the slowing down of the latter and the subsequent automatic adjustments of the slitter-scorer and/or rotary cut off to effect the desired change over, together with return of the double facer to the high speed operation, is under control of an electrical system including a rotary sequence timer 111. The portion of the system which immediately involves the operation of the clutches 54 and 85 is shown in Fig. 6. The change over sequence is initiated by starting of timer motor 112. In the change over sequence, as described above, the reduction in double facer speed is effected by closing of normally open switch 113 by the associated timer cam 114. This places slow speed relay 115 across the line $l_1$, $l_2$ of the A.C. clutch control circuit. Relay controlled switch 116 is closed in normal machine operation so as to energize solenoid 105 and to thereby hold valve in position to admit pressure to clutch 54 and to release pressure from clutch 85. Energization of relay 115 as described opens switch 116 and closes normally open relay controlled switch 117 to energize solenoid 106 and thereby shift valve to left hand position admitting pressure to clutch 85 and exhausting pressure in clutch 54. This results in slowing down of the double facer as described. After the above described adjustment of the slitter-scorer and/or rotary cut off have been made under control of timer 111, the latter completes the cycle by opening switch 113, de-energizing relay 115, thereby closing switch 116 and opening switch 117 to readjust valve 102 to the normal operating position in which it admits pressure to clutch 54 and exhausts pressure from clutch 85.

Connected to pressure line 95 is a pressure controlled switch 118. This switch is in the C.D. circuit of the drive motor 18 represented by $L_1$, $L_2$. The motor start and stop switches are indicated at 119 and 121. Closing of switch 119 (assuming the motor to be inoperative) places motor run relay 122 across the line $L_1$, $L_2$ and energizes the relay to start the motor. Energization of the relay also closes relay switch 123 which completes a holding circuit including the normally closed stop switch 121 and also the switch 118. When the pressure in line 95 of the fluid pressure system is adequate to completely engage the clutches, the switch 118 will be as shown closing the holding circuit. Should pressure in the fluid system fall to a point where it is inadequate to prevent the clutches from slipping under operating conditions, the switch 118 will automatically adjust to open the holding circuit to de-energize the relay 122 and open holding switch 123, interrupting operation of the motor. At the same time a circuit through stop switch 121 containing a signal light 124 will be closed by switch 118 in the adjusted position to indicate the cause of the machine shutdown.

Certain of the advantages inherent in the use of the relatively simple and rugged variable transmissions unit 41 over the relatively complicated differential mechanisms of the prior art have been mentioned above. Of particular importance is the ability afforded by our transmission for establishing a fixed speed ratio between the main drive shaft and the double facer mechanism at both high and low double facer speed. In addition to this functional advantage, the device by reason of its relative simplicity effects a material saving in the initial cost of machines of the type involved and in the cost of maintenance. Substantial savings are realized also in the practical elimination from the machine of the causes of prior losses in the double faced board which constitutes the work material, namely, inability to precisely control the differential mechanisms previously used. Precision of control is a primary characteristic of the fluid pressure actuated variable speed device of our invention.

We claim:

1. In a machine of the type described including a first mechanism for continuously advancing web material and a second mechanism relatively spaced from the first mechanism along the path of travel of said material and operative to perform work upon the latter, a common drive means for said mechanisms, and means for severing the web at a point between the mechanisms in proximity to the said first mechanism; the improvement comprising variable speed transmission means having an input shaft and an output shaft, said input shaft being coupled to said common drive means, said output shaft being connected to said first mechanism, said transmission being continuously driven by said common drive means during operation thereof, said transmission being operable for selectively driving said output shaft at equal speed with said input shaft, and at a fixed ratio reduced speed differential thereto, for driving said first mechanism at equal or a fixed ratio speed differential with relation to said second mechanism.

2. A machine according to claim 1, and including a friction clutch for alternatively operatively connecting and disconnecting the said shafts, jack shaft means comprising elements geared respectively to the input and output shafts, said shafts when operatively connected through said jack shaft means affording a reduction in speed of the output shaft, a second friction clutch for so operatively connecting the jack shaft elements and for alternatively disconnecting said elements, and actuating means for selectively engaging one of said clutches and for simultaneously disengaging the other clutch.

3. A machine according to claim 2 wherein the clutch actuating means comprises a fluid pressure source, and means for selectively applying pressure from said source selectively to one of the clutches and for simultaneously releasing pressure from the other clutch at a predetermined rate for advancing web material from said first to said second mechanism relatively spaced from said first mechanism.

4. A machine according to claim 3, the means for regulating the rate of application of fluid pressure to the clutches in engaging the latter actuating said clutches for gradual acceleration and deceleration of speed of said output shaft and said first mechanism driven thereby.

5. A two speed variable transmission comprising input and output shafts and fluid pressure friction clutch means for connecting and disconnecting said shafts, said input shaft being telescoped within said output shaft, a jack shaft assembly comprising separate sections telescoped one within the other and fluid pressure friction clutch sections for operatively associating said sections, reduction gear means operatively connecting the input and output shafts to the jack shaft sections respectively, and means for applying fluid pressure to one of said clutches selectively to engage the clutch and for simultaneously exhausting pressure fluid from and to thereby disengage the other clutch.

6. A machine according to claim 1, said variable transmission comprising high and low trains each providing a fixed predetermined speed relation between the common drive and the first mechanism and each including a clutch, means for engaging one of said clutches selectively and for simultaneously disengaging the other clutch and means for regulating the rates of engagement of said clutches for controlled acceleration and deceleration of said output shaft and speed of said first mechanism.

7. A machine according to claim 6, wherein the clutches are of friction type actuated by fluid pressure and wherein the said regulating means consists of devices for controlling the rate of flow of the pressure fluid to the clutches.

8. A machine according to claim 1, and including a friction clutch for alternatively operatively connecting and disconnecting the said shafts, jack shaft means comprising elements geared respectively to the input and output shafts, said shafts when operatively connected through said jack shaft means affording a reduction in speed of the output shaft, a second friction clutch for so operatively connecting the jack shaft elements and for alternatively disconnecting said elements, and actuating means for selectively engaging and disengaging said clutches.

References Cited in the file of this patent

UNITED STATES PATENTS

| | | |
|---|---|---|
| 2,268,143 | Schmitter et al. | Dec. 30, 1941 |
| 2,286,873 | Schwartz | June 16, 1942 |
| 2,309,728 | Goettsch | Feb. 2, 1943 |
| 2,384,809 | Bullard et al. | Sept. 18, 1945 |
| 2,764,217 | Goettsch | Sept. 25, 1956 |
| 2,774,249 | Moline | Dec. 18, 1956 |